US010066752B2

(12) United States Patent
Zellweger et al.

(10) Patent No.: US 10,066,752 B2
(45) Date of Patent: Sep. 4, 2018

(54) EXPLOSION-PROOF VALVE

(71) Applicant: RICO-SICHERHEITSTECHNIK AG, Herisau (CH)

(72) Inventors: Daniel Zellweger, Gais (CH); Giuseppe Walter Aloi, Widnau (CH); Pascal Oberlin, Lüchingen (CH)

(73) Assignee: Rico-Sicherheitstechnik AG, Herisau (CH)

( * ) Notice: Subject to any disclaimer, the term of this patent is extended or adjusted under 35 U.S.C. 154(b) by 189 days.

(21) Appl. No.: 14/785,132

(22) PCT Filed: Apr. 19, 2013

(86) PCT No.: PCT/EP2013/058153
§ 371 (c)(1),
(2) Date: Oct. 16, 2015

(87) PCT Pub. No.: WO2014/169961
PCT Pub. Date: Oct. 23, 2014

(65) Prior Publication Data
US 2016/0061339 A1   Mar. 3, 2016

(51) Int. Cl.
*F16K 15/03* (2006.01)
*F16K 17/34* (2006.01)
(Continued)

(52) U.S. Cl.
CPC ............ *F16K 15/03* (2013.01); *F16K 15/033* (2013.01); *A62C 2/12* (2013.01); *B01D 46/0093* (2013.01);
(Continued)

(58) Field of Classification Search
CPC ........ F16K 17/34; F16K 15/033; F16K 15/03; A62C 2/12; B01D 46/0093; Y10T 137/7898
See application file for complete search history.

(56) References Cited

U.S. PATENT DOCUMENTS 3,013,579 A * 12/1961 Gilliam .................... F16K 1/24
                                                          137/515.5
3,677,289 A    7/1972 Rivers et al.
(Continued)

FOREIGN PATENT DOCUMENTS

DE    10 2007 010 060 B3    6/2008
GB         2 064 721 A      6/1981
(Continued)

OTHER PUBLICATIONS

International Search Report Corresponding to PCT/EP2013/0581583 dated Dec. 20, 2013.
(Continued)

*Primary Examiner* — Marina Tietjen
*Assistant Examiner* — Frederick D Soski
(74) *Attorney, Agent, or Firm* — Davis & Bujold PLLC; Michael J. Bujold

(57) ABSTRACT

An explosion-proof valve (1), particularly a flap valve (1), for interrupting a flow of fluid (F), particularly in a pipeline, and comprising a valve housing (3) that has a passage opening (4) for the passage of the flow of fluid (F), and a valve seat (5) arranged at the passage opening (4), as well as a closing element (6), particularly a flap plate (6), which comprises a sealing surface (9) and lies with the sealing surface (9) against a valve seat (5) when in a closing position. The closing element (6) is moveably mounted on a bearing (17, 17') in the valve housing (3). The bearing (17, 17') of the closing element (6) is designed such that the closing element (6) can be moved, in a closing direction, out of the operating position and into the closing position by rotational and linear movement.

21 Claims, 7 Drawing Sheets

(51) Int. Cl.
 B01D 46/00 (2006.01)
 A62C 2/12 (2006.01)
(52) U.S. Cl.
 CPC ......... *F16K 17/34* (2013.01); *Y10T 137/7898* (2015.04)

(56) References Cited

U.S. PATENT DOCUMENTS

| | | | | | |
|---|---|---|---|---|---|
| 3,687,157 | A | * | 8/1972 | Whitmer | E21B 21/106 137/515 |
| 4,353,390 | A | * | 10/1982 | Karpenko | F16K 15/03 137/527.8 |
| 4,605,198 | A | * | 8/1986 | Greiner | F16K 1/24 251/229 |
| 4,667,883 | A | * | 5/1987 | Fink, Jr. | B05B 1/3013 137/527 |
| 4,669,500 | A | * | 6/1987 | Strelow | F16K 15/03 137/514 |
| 5,106,052 | A | * | 4/1992 | Datta | F16K 1/24 251/229 |
| 5,305,787 | A | * | 4/1994 | Thygesen | F16K 15/033 137/527 |
| 5,622,205 | A | * | 4/1997 | Petersen | F16K 15/181 137/242 |
| 6,164,324 | A | * | 12/2000 | Gradle | F16K 15/03 137/527 |
| 2007/0095406 | A1 | * | 5/2007 | Colton, Jr. | F16K 15/031 137/553 |
| 2008/0308159 | A1 | | 12/2008 | Stunkard | |
| 2012/0048399 | A1 | | 3/2012 | Zellweger et al. | |
| 2013/0061957 | A1 | * | 3/2013 | Hapner | E03F 7/04 137/527 |
| 2013/0240059 | A1 | * | 9/2013 | Baumann | F16K 47/08 137/527 |
| 2014/0150904 | A1 | * | 6/2014 | Powell | E03F 7/04 137/511 |

FOREIGN PATENT DOCUMENTS

WO 2007/019560 A2 2/2007
WO 2010/130724 A1 11/2010

OTHER PUBLICATIONS

Written Opinion Corresponding to PCT/EP2013/0581583 dated Dec. 20, 2013.

* cited by examiner

EXPLOSION-PROOF VALVE

The invention relates to an explosion protection valve, in particular a check flap for explosion decoupling, for shutting off a fluid flow, in particular in a pipeline, as per the preamble of claim 1.

Explosion protection valves of said type have long been known, and are commonly used, for installation in plants with liquid or gaseous fluid flows, in particular also in the case of the pneumatic delivery of, for example, powdery goods. The main purpose consists in disrupting the propagation of pressure waves and/or flame fronts in at least one direction in order to prevent more extensive damage to normally sensitive parts of the plant. Here, explosion protection valves may have different closing bodies, which are in the form of hollow bodies, flaps or slides.

Simple flap valves are known, such as are described for example in DE 10 2007 010 060 B3. Said flap valves have, in a valve housing, a valve flap which is mounted at one side and which is opened by the fluid flow in one direction and which, in the event of an explosion, is closed by the explosion pressure that arises in the opposite direction. Here, however, for the valve flap which pivots out in its entirety, sufficient space must be provided in the valve housing, whereby the valve housing takes up a relatively large amount of space. Likewise, a high operating pressure must be imparted in order to lift the flap into an operating position, which entails a high flow resistance.

A further flap valve is described in WO 2010/130724 A1. Said flap valve has a flap plate which is curved in accordance with the pipe curvature and which is lifted in an opening direction toward the pipe wall by the fluid flow. In the event of an explosion, the flap plate is moved in the opposite direction, into a closed position, by the explosion pressure. The flap valve comprises a locking device which arrests the flap plate in the closed position. As the locking device is arranged in the fluid flow, fouling or abrasion of the locking mechanism can occur. This may give rise to increased maintenance outlay in order to ensure reliable operation. Furthermore, the flap plate is of relatively complex construction owing to the curvature.

In general, in the case of known explosion protection valves, disadvantages include a normally complex construction, and a lack of reliability with regard to the arresting of the flap plate and with regard to adequately rapid sealing in the closed position. For use in pneumatic delivery lines in particular, there have hitherto been no known low-maintenance valves of simple construction which provide a closing function in the event of an explosion with adequate reliability.

It is therefore an object of the invention to overcome the disadvantages of the prior art. In particular, it is an object of the invention to provide an explosion protection valve which can be used in a versatile manner and which provides reliable protection in the event of an explosion. Furthermore, the explosion protection valve should be of simple construction and of space-saving design. Likewise, the explosion protection valve should exhibit low wear, and be economical in operation, with little outlay in terms of maintenance, and should in particular have a low flow resistance during normal operation.

Said objects are achieved according the invention by means of the features of the independent claim, which relates to an explosion protection valve, in particular a non-return flap for explosion decoupling, for shutting off a fluid flow, in particular in a pipeline, comprising a valve housing with a passage opening for the passage of the fluid flow, and a valve seat arranged at the passage opening. The explosion protection valve also comprises a closing body, in particular a flap plate, with a sealing surface, wherein the closing body is mounted in movable fashion on the valve housing on a bearing so as to be movable at least between a rest position, an operating position and a closed position. Here, the closing body is situated in the rest position in the absence of a fluid flow, the passage opening is opened up by the closing body in the operating position, and the passage opening is closed by the closing body in the closed position, wherein the closing body bears by way of the sealing surface against the valve seat. Here, the closing body can be moved into the operating position under the action of operating pressure, and can be moved into the closed position under the action of a closing pressure that differs from the operating pressure, wherein the closing body can be arrested, preferably automatically, in the closed position by means of a locking device. The explosion protection valve according to the invention is characterized in that the bearing of the closing body is designed such that the closing body can be moved in a closing direction from the operating position into the closed position by way of a rotational movement and a linear movement.

Here, "operating pressure" refers to a pressure generated by the fluid flow during intended operation. The operating pressure is generated by the fluid flow that typically flows through the passage opening into the valve housing. The closing body passes into an "operating position" in a manner dependent on the value selected for the operating pressure. "Operating position" thus refers to a multiplicity of possible positions of the closing body. In particular, the rest position and the operating position may coincide. It is however basically also not ruled out that the rest position coincides with the closed position.

A "closing pressure" refers to a pressure which differs from the operating pressure and which may be caused for example by an explosion pressure wave in the pipeline. The explosion protection valve is preferably designed such that a resultant force exerted by the operating pressure on the closing body substantially opposes a resultant force exerted by the closing pressure.

In the present case, "linear movement" refers to a rectilinear movement in which all points of the closing body pass through mutually parallel rectilinear paths (translational movement). Here, it is self-evidently possible for secondary deviations to arise, for example as a result of deformations of the closing body owing to mechanical loading.

In the present case, "rotational movement" may refer, for example, to a rotation about a geometric axis of rotation passing through the closing body, or else may refer to a rotation about an axis of rotation lying outside the closing body. The present rotational movement is in relation to a geometric axis which is inclined with respect to a primary flow direction, and which is in particular oriented substantially perpendicular to said primary flow direction. In particular, the geometric axis is arranged parallel to a plane of the valve seat.

The bearing of the closing body may be designed in a variety of ways in order to provide the mobility according to the invention. What are conceivable, for example, are curved guides which guide the closing body in the rotational movement and in the linear movement in a closing direction from the operating position into the closed position. Here, the bearing may for example comprise a curved disc which controls said mobility. It is likewise possible for curved guides to be arranged for example on walls of the valve housing, which curved guides directly or indirectly guide the closing body on curved paths and/or rectilinear paths. The bearing may however also comprise purely rotary bearings which are arranged for example on a longitudinally displaceable carriage. Control of the mobility may in this case be realized for example by way of a control curve or a curved disc. The bearing may guide the closing body either in a superposed rotary and linear movement or in a sequential sequence of said movements.

The explosion protection valve is preferably designed such that the closing movement, that is to say the transition from the operating position into the closed position, takes place automatically when a closing pressure arises. Here, the explosion protection valve is generally designed, and provided for installation, such that the closing body passes from the operating position into the rest position under the action of gravitational force. Here, the fluid flow in the explosion protection valve is typically oriented 2 horizontally. In this case, the closing body can pass into the rest position in the absence of the fluid flow, for example under the action of gravitational force. Embodiments of the explosion protection valve are self-evidently also conceivable in which a fluid flow may be oriented vertically or in any desired direction. In this case, but also in the case of a horizontal orientation, an adjustment device may be provided which adjusts the closing body into the rest position during normal operation in the absence of the fluid flow. Likewise, ad adjustment devices are conceivable which assist a transition of the closing body into the operating position in order, for example, to reduce the flow resistance of the explosion prevention valve. Such adjustment devices may for example comprise spring elements which, for example, engage on the closing body directly or indirectly via an axle body or are formed on the bearing.

By virtue of the closing body being mounted such that it can be moved in the closing direction in a linear movement and in a rotational movement, a closing movement of the closing body for closing the passage opening can be optimized, for example with regard to a closing time and a closing travel. In particular, in an end phase of the closing movement in the closing direction, the closing body can be set down on the valve seat in a purely linear movement. In this way, highly simultaneous and thus reliable sealing of the passage opening is ensured.

Owing to the additional mobility in a rotational movement, the closing body can pass from an operating position into the closed position which is not predefined by the linear movement alone. In this way, it is for example possible for the closing body, when in the operating position, to have been pivoted out of the fluid flow or, for a reduced flow resistance, to be oriented along a flow direction, wherein the linear setting-down on the valve seat is not impaired. In particular, owing to the linear movement, it is possible for the closing body to be offset away from the passage opening when in the rest position and/or in the operating position. In this way, it is for example possible for the closing body, when in the operating position, to have been pivoted partially into the passage opening without abutting against the valve seat, which would not be possible in the case of a purely rotational movement. This gives rise to a particularly compact design of the explosion protection valve.

It is self-evident that a movement counter to the closing direction, that is to say for example from the closed position or from the rest position into the operating position, may correspond to the corresponding movement segment of the closing movement in the opposite direction.

The linear movement and the rotational movement may, according to the invention, be superposed on one another. It is however preferable for the rotational movement and the linear movement to take place sequentially, that is to say one after the other.

The bearing is therefore preferably designed such that the closing body, for the transition from the operating position into the closed position, can be moved firstly in the, in particular, purely rotational movement and subsequently in the, in particular, purely linear movement. The closing movement is thus divided into a first movement segment and a second movement segment. It is ensured in this way that, in the end phase of the closing movement, the closing body can be set down by way of the sealing surface against the valve seat in a linear movement. Here, the direction of the linear movement is preferably oriented parallel to the primary flow direction of the fluid flow during intended operation. Here, a position of the closing body upon the transition from the rotational movement to the linear movement may correspond to the rest position. A transition from the rest position into the operating position may thus take place in an in particular purely rotational movement. In other words, in this case, the closing body is movable in the closing direction only in the linear movement from the rest position, and is preferably movable in an opening direction only in the rotational movement.

Here, the sealing surface of the closing body and the valve seat may be of planar form and oriented plane-parallel to one another, and in particular spaced apart from one another, when the closing body is movable in the linear movement. In this way, it is ensured that the sealing surface can be set down on the valve seat uniformly, in particular substantially simultaneously over the entire circumference of the passage opening. In particular, the sealing surface of the closing body and the valve seat are oriented plane-parallel to one another both in the rest position and in the closed position.

The closing body may be mounted on the bearing by way of an axle body. In this way, the bearing can be arranged spaced apart from a flow region and outside a primary fluid flow in the valve housing. Here, a second bearing of mirror-symmetrical form is preferably provided, wherein the two bearings are arranged parallel to one another on both sides of the passage opening, wherein the closing body is mounted on the two bearings. It is ensured in this way that, even in the case of large-dimensioned embodiments of the explosion valve, the closing body is securely mounted and, for example, unilateral twisting owing to an explosion pressure wave can be reduced or prevented.

Here, the bearing may comprise a rotary guide and a linear guide for a control body which is connected rigidly to the closing body. In this way, the individual movement segments of the closing movement can be controlled by way of the control body, which may be arranged spaced apart from the closing body, for example in or at the bearing. Here, the control body may be rigidly connected to the closing body directly or, preferably, via an axle body, if one is provided. The bearing preferably comprises a monolithic bearing body in which the guides are formed.

Here, a rotary guide is to be understood to mean any type of guide which guides the control body in a rotary, curved or turning movement. In particular, said rotary guide may comprise a rotary bearing, or else for example a curved guide, in which the control body is guided on a curved path. A linear guide is to be understood to mean any type of guide in which the control body is guided on a rectilinear path. The rotary guide or linear guide may in each case impart positive guidance, that is to say permit only one degree of freedom of the movement of the control body. The guides may however also permit multiple degrees of freedom, in the manner of a unilateral control surface. In this case, positive guidance that may be desired may be realized for example through the interaction of multiple guides of the bearing.

By virtue of the control of the mobility of the closing body on the bearing being realized by way of a control body, no special structural measures need to be implemented on the closing body itself. It is self-evidently possible, in variants, for the control of the closing movement to also be realized directly on the closing body.

If the control body is connected rigidly to the closing body via the axle body, the control body is preferably arranged centrally with respect to the axle body. Here, a central arrangement refers, for example, to an arrangement in which a longitudinal axis of the axle body passes through a center of gravity of the control body. Here, the control body may for example be in the form of an elongate, substantially prismatic body which is arranged perpendicular to the longitudinal axis of the axle body. Owing to the central arrangement, the bearing can be of compact form, as a rotational movement of the control body takes up the least possible amount of space. This not least also yields increased safety owing to a lower mechanical load as a result of shorter effective lever arms.

In variants, it is self-evidently also possible, depending on requirements, for the control body to also be arranged eccentrically, for example spaced apart from the axle body, and guided, for example, on a curved path in a curved guide. Here, the control body may for example be a simple guide pin which is guided in the curved guide.

It is basically possible, in a simple manner, to implement combined linear and rotary guidance by virtue, for example, of a circular axle body being guided in a slot. In this way, simultaneous rotatability and displaceability of the axle body, and thus of the closing body, is ensured. In the present case, the linear movement and rotational movement preferably constitute mutually separate movement segments, which can be performed sequentially, of the closing movement. For this purpose, it is advantageous for the linear guide and rotary guide to be designed such that the control body is guided rotatably in one of the guides and is guided rectilinearly in the other guide. Here, a transition of the control body from one guide into the other guide is possible only in a predefined position of the closing body. Here, it is self-evidently possible, for a compact design, for the guides to be of superposed form, wherein, for example, elements of one guide serve, by way of a dual function, as elements of the other guide.

The rotary guide and the linear guide are preferably designed and arranged relative to one another such that the control body can be introduced into the linear guide from the rotary guide only in a predefined rotational position. It is ensured in the way that the closing body, which is rigidly connected to the control body, is in a predefined position when it is to be displaceable rectilinearly, for example in order to be set down on the valve seat.

For this purpose, the rotary guide may have a recess in which the control body, guided in a radial and/or in an axial direction, is at least partially rotatable about a geometric axis of rotation defined by the rotary guide. In the case of a central arrangement of the control body on the axle body, the geometric axis of rotation, defined by the rotary guide, generally coincides with the longitudinal axis of the axle body when the control body is situated in the rotary guide. By virtue of the control body being guided both in an axial direction and in a radial direction, the rotary guide yields only a rotational movement as a single degree of freedom of movement. The recess thus permits a compact design of the bearing.

Specifically, it is advantageously the case that the recess is, in a radial direction with respect to the geometric axis of rotation, at least partially delimited by circular cylindrical shell surface sections with a radius of curvature which corresponds to half of a radial dimension of the control body. In the present case, corresponding dimensions are to be understood in each case as including of a tolerance value which permits guided mobility of the control body. The shell surface sections are preferably arranged opposite one another with respect to the geometric axis of rotation defined by the rotary guide. It is achieved in this way that the shell surface sections form radial guide surfaces for the rotational movement of the control body.

The linear guide advantageously comprises a groove section which adjoins the recess in a radial direction and into which the control body is displaceable out of the recess of the rotary guide in the displacement direction of the linear guide. It is also self-evidently possible for the linear guide to be formed as a groove section independently of the form of the rotary guide.

The control body preferably has at least one section which is in the form of a prismatic body and by means of which said control body can be introduced into the groove section. A cross section of the prismatic section preferably corresponds here to a cross section of the groove, such that the control body, as a carriage, is at least partially guided displaceably in rectilinear fashion in the groove section.

It is preferably the case that the entire control body is in the form of an elongate, substantially prismatic body. End-side surfaces of the control body may in this case be of curved form in order, for example, to form a suitable sliding surface for sliding on the shell surface sections of the rotary guide. It is self-evidently also possible for the control body, at the end sides, to have in each case one rolling bearing by which said control body can roll with reduced resistance on the shell surface sections.

To limit the rotatability of the control body, it is advantageously provided that, in the recess, there is formed at least one stop element with a stop surface which delimits the rotational movement of the control body in the recess such that the control body can be displaced into the linear guide when said control body bears against the stop surface. Here, it is preferable for the stop surface to be aligned with a guide surface of the groove section, if the linear guide is in the form of a groove section. In this case, the guide surface of the groove section continues, as a stop surface, into the recess. The guide surface and the stop surface thus, in their entirety, form a unilateral guide surface for the control body, along which said control body can be displaced out of the rotary guide into the linear guide. The stop surface thus simultaneously forms a rotational delimiter of the rotary guide and a guide surface of the linear guide. The rotary guide and linear guide are in this case of partially superposed form.

It is preferable for a further stop with a further stop surface to be arranged in the recess, which further stop is arranged axially symmetrically with respect to the geometric axis of rotation of the rotary guide. Here, the two stop surfaces are arranged such that the control body, when in the corresponding rotational position, bears against both stop surfaces. In particular, the further stop surface is possibly aligned with a further guide surface of the groove section. It is ensured in this way that the control body is oriented for introduction into the linear guide when said control body bears against the stop surface or against the stop surfaces.

Depending on requirements, the stop surface advantageously forms a plain bearing for the control body. Here, it may be advantageous for the control body to be manufactured, for example, from a softer material than the stop surface. For example, the control body may, in the manner of known plain bearings, be manufactured from brass or bronze, whereas the stop surface comprises a steel. Forming the control body from such materials may also be advantageous only with regard to end-side sliding on the shell surface sections, which may for example likewise be manufactured from steel.

In certain applications, for example owing to large-dimensioned closing bodies in the case of, for example, large pipe diameters, high friction forces may arise between the stop surface and control body, which friction forces prevent a reliable closing movement caused by the closing pressure on the closing body. In this case, it may be advantageous for a rolling bearing for the control body to be arranged on the stop surface. In this way, it can be ensured that the control body can be introduced into the linear guide with the least possible resistance. Whereas rolling bodies, such as for example rollers, mounted rotatably on the stop surface may suffice for certain applications, it may be advantageous, for particularly low resistance, for the rolling bearing to be formed with multiple rolling bodies arranged with a rolling body cage in a rolling bed. The rolling body bed is in this case preferably formed on the stop surface and dimensioned so as to ensure adequate displaceability of the rolling body cage. In this case, the control body is preferably manufactured from an adequately hard material, in particular from hardened steel, in order to prevent wear owing to the rolling bearing. The further stop surface may be formed analogously; in other words, it may be formed as a plain bearing or comprise a rolling bearing.

In the case of an axle body, the bearing advantageously additionally comprises a longitudinal guide in which the axle body is guided in rotatable and displaceable fashion, wherein a displacement direction of the longitudinal guide is parallel to the displacement direction of the linear guide for the control body. The longitudinal, guide of the axle body may in this case be in the form of a simple slot on the bearing body. In this way, the control body can be relieved load, as the longitudinal guide can, via the axle body, absorb a part of the forces and moments acting on the closing body. It is likewise possible, owing to the additional longitudinal guide, to achieve that the rotary guide and/or the linear guide of the control body can be formed as simple control surfaces, and nevertheless altogether yield positive guidance.

According to the invention, to arrest the closing body in the closed position, the explosion protection valve has a locking device. Such locking devices may be designed in a variety of ways, for example as simple self-acting or controlled bolts which act directly on the closing body. The locking device however advantageously comprises a self-inhibiting mechanism which automatically inhibits a movement counter to the closing direction.

For this purpose, the locking device preferably comprises a freewheel which permits the mobility of the closing body in the closing direction and blocks said mobility in the opposite direction, at least when the closing body is in the closed posit ion. Here, a freewheel is to be understood to mean a device which ensures substantially free mobility in one direction of movement, while the mobility is blocked in another direction of movement. In the present case, the freewheel may be designed such that the closing body, in the closed position or else already in an end phase of the closing movement, is blocked in a movement direction counter to the closing direction. The freewheel is preferably arranged outside the primary fluid flow. For this purpose, the freewheel may for example act directly on the axle body.

It is however preferable if the freewheel is formed on the bearing and, to arrest the closing body, acts directly or indirectly on the control body. The freewheel may thus be formed as an integral constituent part of the bearing, which is advantageous with regard to construction and maintenance. In particular, the freewheel may for example be integrated into the rotary guide or into the linear guide.

It is advantageously the case that the freewheel is formed on the linear guide and comprises a blocking body, in particular a roller body, which is arranged in a blocking body bed and which can become wedged between the control body and the blocking body bed if the control body is displaced in the linear guide counter to the closing direction. It is ensured in this way that the control body is blocked by the freewheel when said control body has passed sufficiently far into the linear guide. As a blocking body bed, the freewheel preferably comprises a plane which is oblique with respect to the displacement direction of the linear guide and on which there is arranged a spring-loaded rolling body, in particular a ball, as a blocking body. The oblique plane is oriented such that, in the closing direction, it is inclined away from the displacement direction, or in the direction opposite to said displacement direction. The oblique plane is arranged relative to the linear guide such that, depending on the position of the rolling body, said rolling body may be arranged entirely outside the linear guide or so as to extend into the linear guide. Such freewheels are known from bicycles as clamping body freewheels.

In variants, the freewheel may for example also be in the form of a pawl-type freewheel, wherein the control body must be of special design in this case, whereas, in the case of the clamping roller freewheel, a clamping surface, which is generally provided in any case, on the control body is sufficient. Depending on the material of the control body, it is possible, for reduced wear, for an insert composed for example of hardened steel to be formed as a clamping surface on the control body in order that the rolling body does not dig into the control body in the event of repeated blocking. It is self-evidently possible for the blocking body and blocking body bed to also be formed on the control body, though this is generally more cumbersome in terms of construction.

For the release of the arresting action, the freewheel is preferably formed on a bearing shoe which is arranged in the bearing so as to be displaceable in a release direction, in particular in the direction of the displacement direction of the linear guide. As the freewheel provides a self-inhibiting mechanism, a change in the load conditions is generally required in order for the arresting action, once established, to be released. In the present case, this may be realized by way of the displaceable bearing shoe. Owing to the displacement of the bearing shoe, the blocking body can be moved into a region of the blocking body bed in which the arresting clamping action is reduced or eliminated. In this way, mobility of the closing body counter to the closing direction is made possible, whereby the closing body can for example be moved from the closed position into the rest position. It is self-evident that the bearing shoe is, for this purpose, formed in a correspondingly formed displacement guide on the bearing, in particular on the bearing body.

The bearing shoe is advantageously designed so as to comprise a part of the linear guide, in particular possibly a guide surface of the groove section, and/or a part of the rotary guide, in particular possibly one of the two shell surface sections.

By virtue of the fact that the bearing shoe simultaneously comprises elements of the rotary guide and/or of the linear guide, the bearing can be of particularly compact design. It is preferable for a guide surface of the groove section and one of the shell surface sections of the recess of the rotary guide to be formed entirely on the bearing shoe. In this way, it is possible to prevent a situation in which, at surface transitions, inaccuracies can arise owing to manufacturing tolerances, or increased outlay is required in order to eliminate said inaccuracies.

The blocking body bed is advantageously arranged on the bearing shoe, in particular possibly on a guide surface of the groove section. In this way, the blocking body and a spring element can be arranged on the bearing shoe, and do not need to be integrated in cumbersome fashion into the control body, for example.

To realize a displacement of the bearing shoe in a release direction (or possibly in the opposite direction), the bearing may comprise a threaded spindle which is supported, so as to be rotatable about its longitudinal axis, both on the bearing shoe and on the bearing such that, in the event of a rotation about the longitudinal axis, the bearing shoe can be displaced at least in the release direction (or possibly in the opposite direction). Other actuating devices by means of which the bearing shoe can be displaced are self-evidently also conceivable. A threaded spindle however has the advantage that, by means of the thread, a relatively large force can be exerted, which is often necessary in order to release the freewheel, for example owing to an intense wedging action of the blocking body. The threaded spindle is preferably supported on the bearing, in particular on the bearing body, via a thread. The threaded spindle may for example be guided outward through the valve housing and actuated in manually or mechanically driven fashion in order to eliminate an arresting action of the locking device. The threaded spindle is preferably supported on the bearing shoe by way of a rotary seat in which the spindle is freely rotatable about its longitudinal axis but is supported in a longitudinal direction.

For this purpose, the threaded spindle is preferably supported rotatably on the bearing shoe by way of a driver element which is inserted loosely into a recess of the bearing shoe. In this way, the assembly of the bearing is simplified, as the driver element merely has to be placed in and, in the fully assembled state of the bearing, is held in the recess by a guide for the bearing shoe.

In the explosion protection valve there may be provided a monitoring device by means of which a present position of the closing body, in particular the rest position and/or the closed position, can be monitored. Here, the monitoring device may basically be designed for direct monitoring of the closing body itself. The monitoring is however preferably realized indirectly, possibly for example by way of the axle body and/or control body connected rigidly to the closing body. In this way, the monitoring device can be arranged outside a primary fluid flow, in particular on the bearing. It is basically not necessary for all possible positions of the closing body to be monitored. For a simplified construction, it may be provided that the monitoring device monitors only individual positions. These preferably include the rest position, in order to identify whether the closing body has passed correctly into the rest position in the absence of operating pressure. It is likewise preferably possible for a closed positron to be monitored in order to monitor for correct closing in the event of an explosion. In particular, in the event of a deviation from an intended position, it is for example possible for a level of fouling of the explosion protection valve, for example owing to accumulated material to be conveyed, to be determined.

The monitoring device advantageously comprises a mechanical measurement sensor which is formed in particular on the bearing and which can be placed into different measurement positions in a manner dependent on the position of the closing body. Here, the mechanical measurement sensor can, preferably possibly by the control body, be placed into a first measurement position when the closing body is in the rest position and into a second measurement position when the closing body is in the measurement position. A rest position of the measurement sensor may in this case correspond to a further measurement position, which for example indicates whether the closing body is in an operating position. Here, the measurement sensor is preferably at least partially arranged in a transition region from the rotary guide to the linear guide of the bearing, in order to possibly be able to detect both a rotational position of the control body in the rotary guide and a displacement position in the linear guide. Preferably, the pin possibly projects into the groove section of the linear guide as far as the recess of the rotary guide.

By virtue of the fact that the mechanical measurement sensor assumes predefined measurement positions, it is for example possible for a level of fouling of the explosion protection valve to be determined from a deviation of said positions. For example, the valve seat and/or the closing body may have, on the sealing surface, accumulations of material to be conveyed, for example, which prevent said closing body from passing into the rest position and/or into the closed position. Said deviation can, at the measurement sensor, be read off in a simple manner owing to a deviation from the corresponding measurement position. In general, it is possible in this way to infer a level of functional integrity of the explosion protection valve.

The mechanical measurement sensor may comprise a pin which can be deflected on the bearing counter to a spring force and which is preferably subjected to load by two spring elements of different spring force which are positioned in series. By virtue of the fact that the mechanical measurement sensor is in the form of a pin, the different measurement positions may be provided for example by a different deflection in the longitudinal direction of the pin. With the spring elements positioned in series, it is possible here for different spring forces to be provided for the individual measurement positions. The pin may for example be guided out of the valve housing to the outside, where a measurement device measures a deflection of the pin. Here, use may for example be made of electromechanical, inductive or optical sensors.

According to the invention, the explosion protection valve has a passage opening, which can be closed by the closing body, for the fluid flow. Said passage opening may basically be formed, for example, in an outer wall of the housing. The passage opening is however preferably in the form of an end-side opening of a pipe stub which is at least partially arranged in the valve housing, wherein an end surface, arranged in the valve housing, of the pipe stub forms the valve seat. The valve seat is preferably of planar form. The pipe stub in the interior of the valve housing may be a continuation of an outer pipe stub with attachment flange for the attachment of the explosion protection valve to the pipeline.

The closing body is advantageously in the form of a preferably substantially disc-shaped flap plate, which is in particular planar at least on one side. As a flap plate, the closing body can be of space-saving and lightweight design. By virtue of the fact that said closing body is of planar form on one side, said closing body has a planar closing surface for closing the passage opening. The sealing surface of the closing body is preferably formed on or at the planar side of the flap plate.

The valve seat preferably lies in a plane which is inclined with respect to a longitudinal direction of the pipe stub, wherein in particular, the pipe stub has a circular cross section and the flap plate is of elliptical form so as to correspond to the passage opening. In this way, a closing travel of the flap plate can be reduced, as the valve seat is inclined toward the primary flow direction, in which the flap plate is substantially aligned under the action of the operating pressure.

In a preferred embodiment, in which the closing body is mounted on the bearing by way of an axle body and the flap plate is of planar form at least on one side, the axle body is arranged on the flap plate so as to lie outside the plane of said flap plate and so as to be offset from a central point toward the edge of said flap plate. Here, the axle body is preferably arranged parallel to a plane of the flap plate. A doubly eccentric arrangement of this type has numerous advantages.

For example, by virtue of the fact that the axle body is arranged on the flap plate so as to be offset from a central point toward the edge of said flap plate ($1^{st}$ eccentric position), it can ensured that, under the action of a pressure, such as for example the operating pressure or the closing pressure, a different resultant force acts on the closing body to both sides of the axle body. In this way, a torque acts on the closing body about the geometric axis of rotation defined by the axle body. The axle body is preferably arranged so as to be offset upward from the central point with respect to a direction of gravitational force. It is ensured in this way that the flap plate is, under the action of the operating pressure, pivoted away from the passage opening and is oriented toward the primary flow direction. It is likewise ensured that, in the absence of an operating pressure, the flap plate is oriented toward a vertical under the action of gravitational force. In the event of an explosion, it is likewise ensured that the flap plate is pivoted in the closing direction under the action of the closing pressure.

Furthermore, by virtue of the fact that the axle body is arranged offset out of the planar side of the closing body ($2^{nd}$ eccentric position), a continuous sealing surface can be provided which is not interrupted by the axle body, such as would generally be the case with a central arrangement of the axle body. The valve seat and the sealing surface can thus both be of continuous form. In this way, a particularly good closing action of the closing body on the valve seat can be ensured.

The axle body is advantageously of flattened form parallel to the plane of the flap plate. The flow resistance can thus be considerably reduced. In this case, the flap plate may, for improved mechanical stability, have stiffening ribs which extend perpendicular to the axle body along the flap plate.

The explosion protection valve may comprise a sealing element on the sealing surface of the closing body and/or on the valve seat. In this way, it can be necessary, in particular in the case of gaseous fluid flows.

The sealing surface of the closing body is preferably formed on an encircling elastic sealing lip, in particular on a spring steel lip. The elastic sealing lip preferably projects beyond a main body of the closing body at an edge side such that, in the closed position, only the sealing lip bears against the valve seat. In this way, the main body of the closing body can, owing to the elastic characteristics of the sealing lip, be pressed into the passage opening under the action of the closing pressure, wherein the sealing lip is pressed sealingly against the valve seat. Depending on the application, the sealing lip may basically be manufactured from any elastic material. The sealing lip is however preferably provided by a spring steel lip which, in the event of an explosion, provides high mechanical stability and at the same time adequate elastic characteristics.

The flap plate advantageously comprises multiple material layers, in particular a spring steel layer arranged between two steel layers, which material layers are, in sections, connected to one another so as to be displaceable relative to one another. Such an arrangement of the material layers permits a displacement, at least in sections, of the individual material layers relative to one another. In this way, analogously to a leaf spring with multiple spring layers, a degree of elasticity of the flap plate is attained. The material layers are preferably arranged parallel to a plane of the flap plate.

Preferably, the spring steel layer projects beyond the steel layers at the edge side and forms the said spring steel lip. In this case, the steel layers form part of the main body of the flap plate.

The closing body may have a special shape by means of which, in the fluid flow, dynamic lift can be generated. In this way, it is possible in particular to assist a transition into the operating position in order to reduce a flow resistance. For this purpose, the closing body preferably has an arched surface in the manner of an aerofoil profile, by means of which, in the fluid flow, dynamic lift can be exerted on the flap plate. The arched surface may, in particular in the case of a flap plate, be in the form of an arched attachment. Any stiffening ribs that may be provided, and/or the axle body, may in this case be entirely or partially covered by the attachment. With a corresponding design of the attachment, it may be the case that no stiffening ribs are required as the attachment itself can provide the required mechanical stability of the closing body, in particular of the flap plate.

On the explosion protection valve, there is preferably provided a safety support which, in the event of an explosion, supports the bearing, in particular a bearing body of the bearing, on the valve housing in addition to a fastening provided for intended operation. In this way, the fastening, provided for operation, can be of relatively small dimensions, because in the event of an explosion, a major part of the load exerted on the bearing is dissipated into the valve housing by the safety support. In this case, the safety support may interact with the bearing for the first time as a result of the load in the event of an explosion.

The invention will be discussed in more detail below on the basis of figures of exemplary embodiments, in which, in each case schematically:

Figure 2:
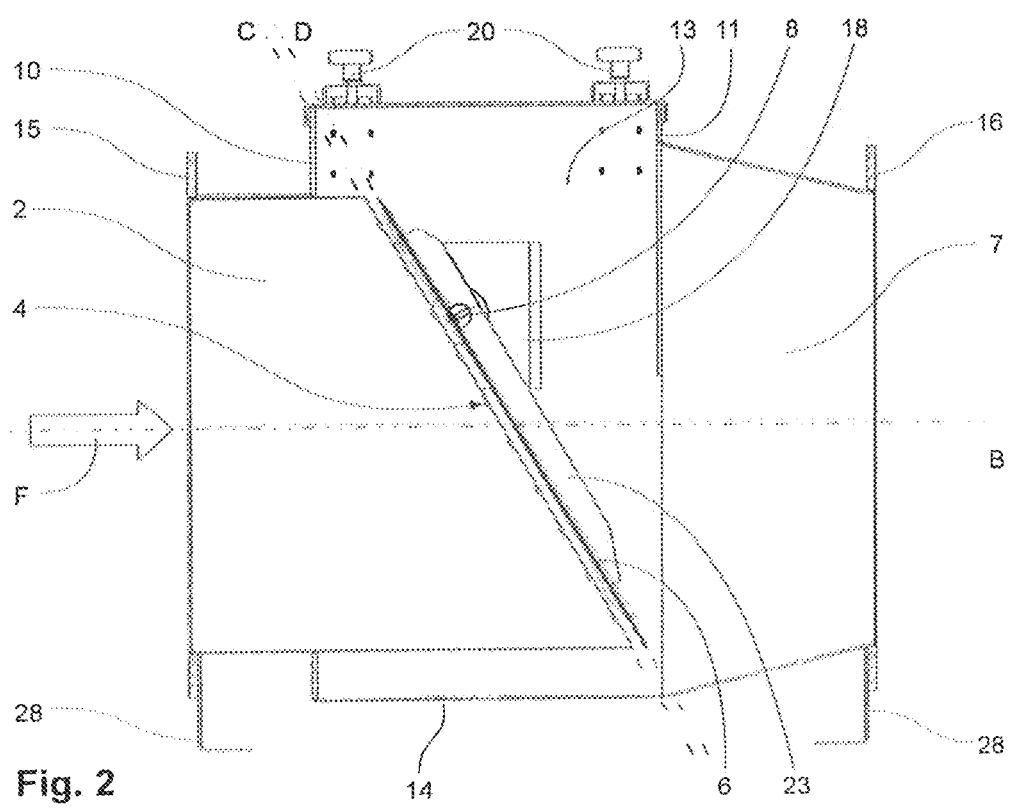
FIG. 2 shows a longitudinal cross section of a specific embodiment of an explosion protection valve according to the invention.
Figure 4A:
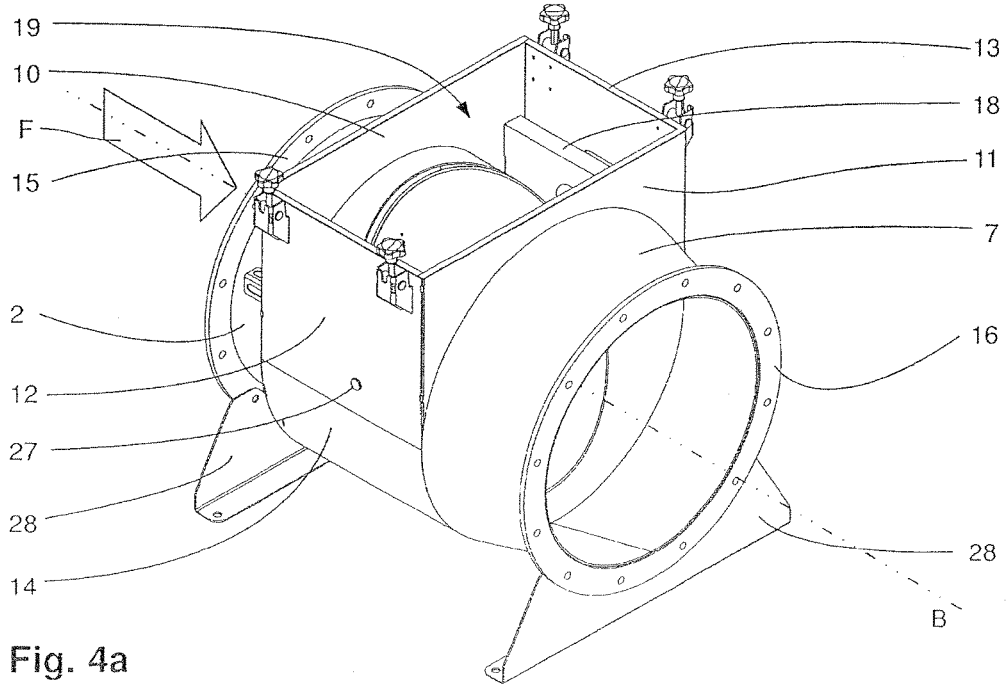
Figure 4B:
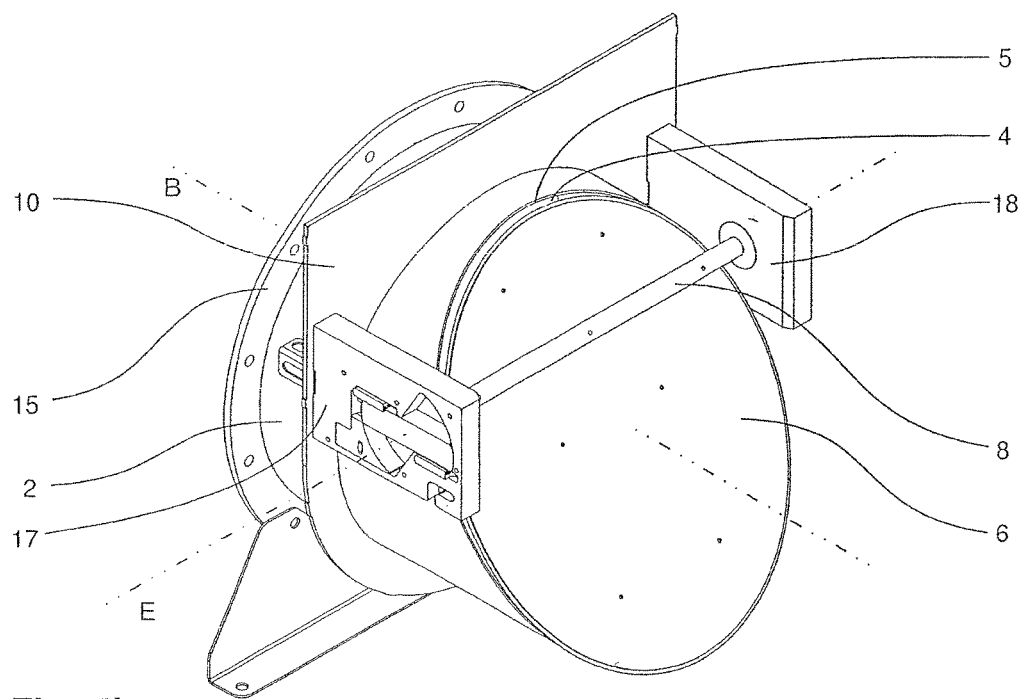
Figure 5:
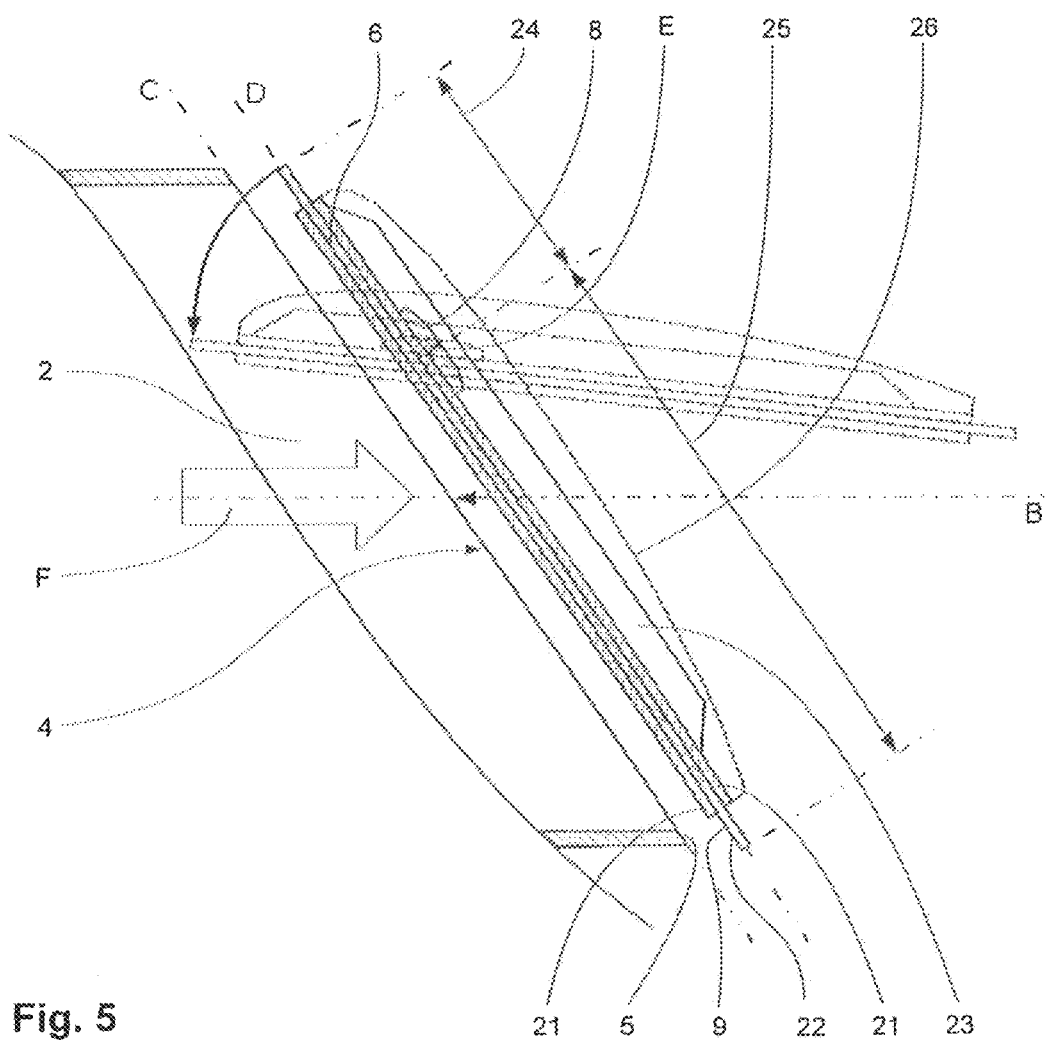
Figure 6:
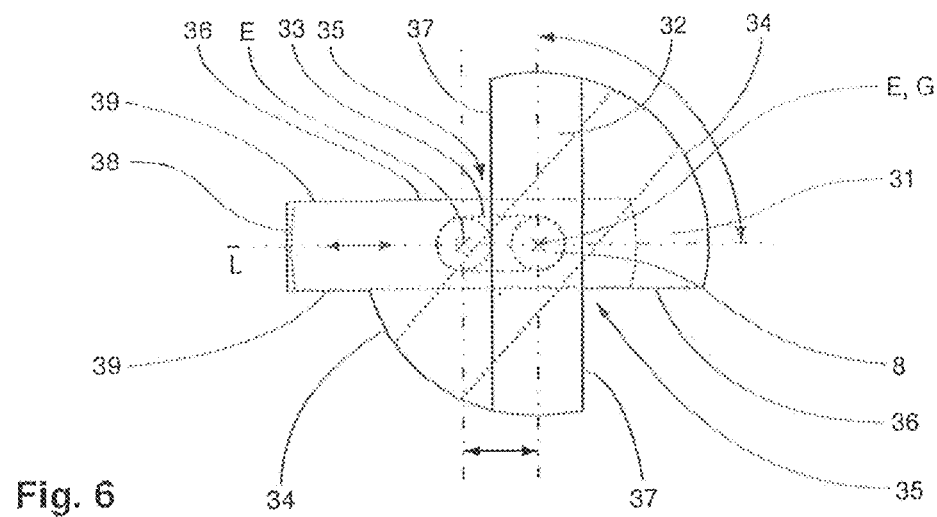
Figure 7:
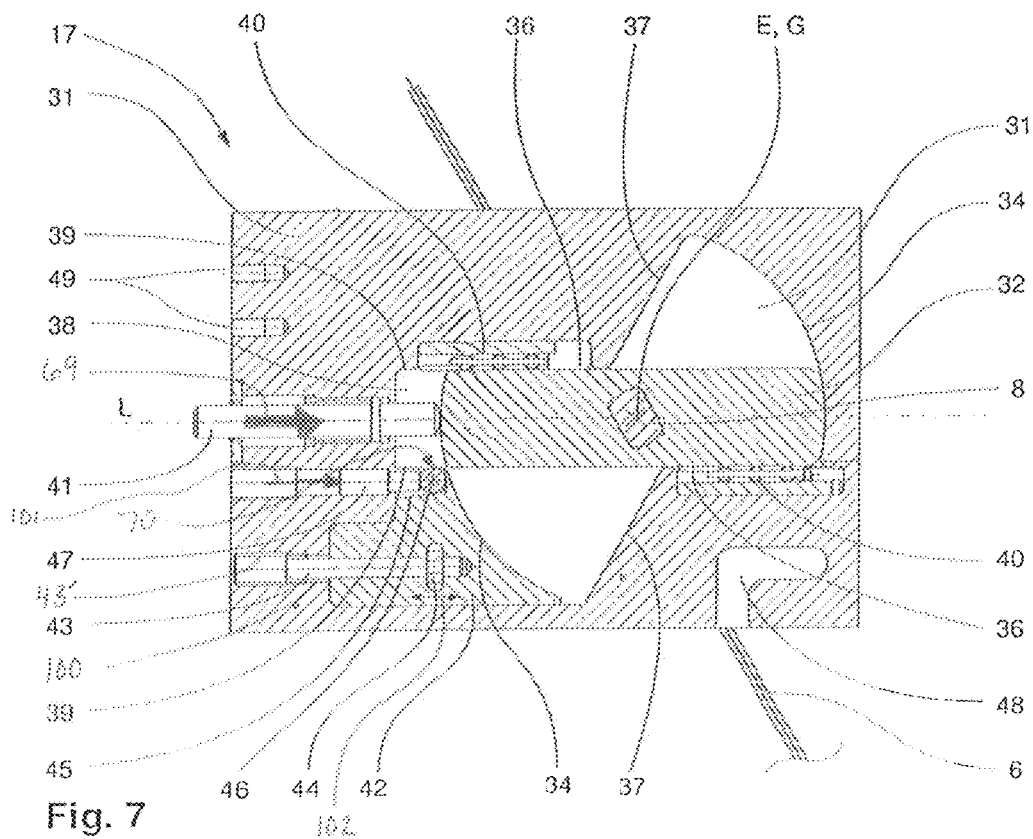
Figure 8:
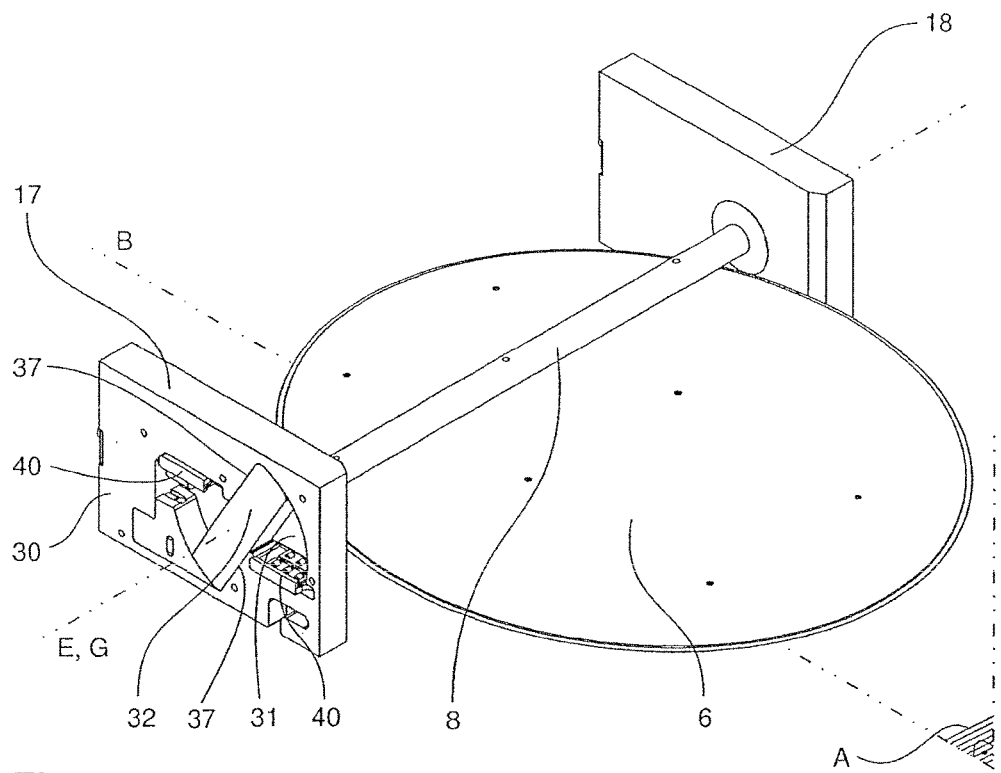
Figure 9A:
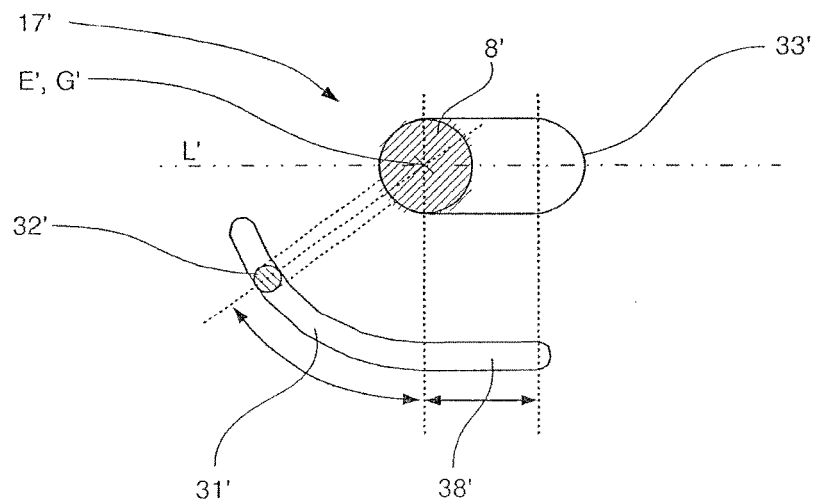
Figure 9B:
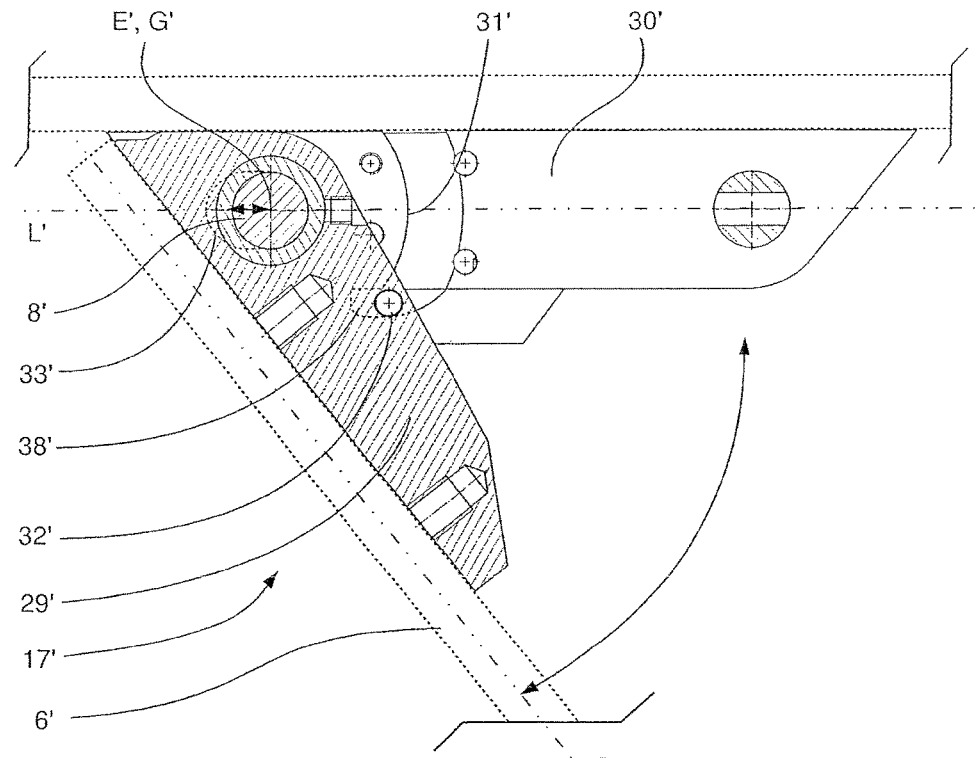
Figure 10:
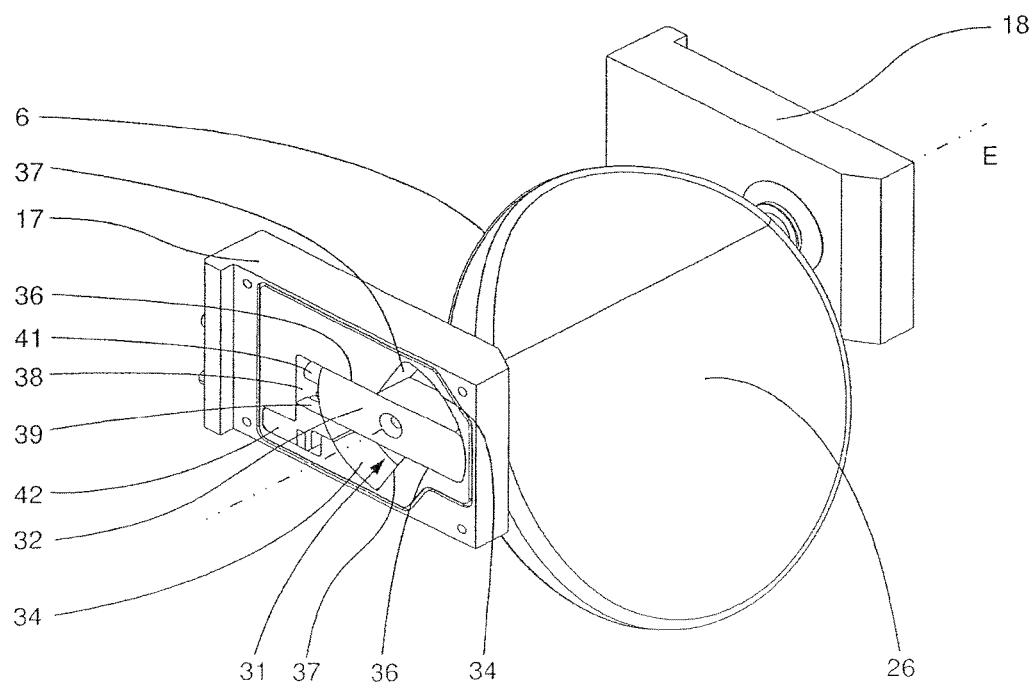

FIG. 4*a* shows an oblique view of the explosion protection valve as per FIG. 2;

FIG. 4*b* shows an oblique view of the explosion protection valve as per FIG. 2, with some elements omitted;

FIG. 5 shows a cross-sectional view of a flap plate of an explosion protection valve according to the invention;

FIG. 6 shows a diagrammatic sketch of a bearing for an explosion protection valve according to the invention;

FIG. 7 shows a specific implementation of the bearing according to the functional principle of FIG. 6 in a longitudinal cross section;

FIG. 8 shows selected elements of the explosion protection vale as per FIG. 2, with the flap plate arranged in an operating position;

FIG. 9a shows a further diagrammatic sketch of a bearing for an explosion protection valve according to the invention;

FIG. 9b shows a specific implementation of the bearing according to the functional principle of FIG. 9a in a longitudinal cross section;

FIG. 10 shows a view, substantially corresponding to FIG. 8, of the explosion protection valve, wherein the flap plate is arranged in the rest position and has a profiled body.

Figure 1:
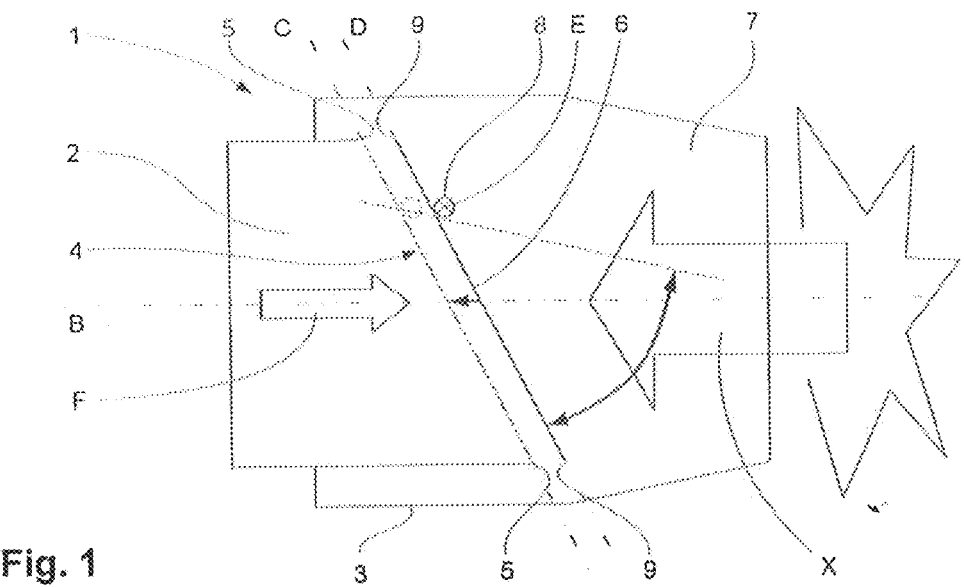
FIG. 1 is an illustration of an explosion protection valve according to the invention.

FIG. 1 is a schematic illustration of an explosion protection valve 1 according to the invention, in a longitudinal cross section in a longitudinal plane A, for illustrating a functional principle. The longitudinal plane A in this case encompasses a longitudinal direction B of the valve 1.

The longitudinal direction B is in this case defined as the longitudinal direction of a pipe section 2 arranged upstream, through which pipe section a fluid flow F flows into a valve housing 3 of the valve 1 during normal operation. The longitudinal direction B thus corresponds to a primary flow direction. Within the valve housing 3, the pipe section 2 ends at a passage opening 4, at which the pipe section 2 is open to the interior of the valve housing 3. An end side of the pipe section 2 is arranged in a plane C, and forms a valve seat 5 for a closing body in the form of a flap plate 6.

The plane C is inclined with respect to the longitudinal direction B and is perpendicular to the longitudinal plane A. Thus, by way of its longitudinal end at the inside, the pipe section 2 thus projects into the valve housing 3 to different extents. In the operationally ready state, the valve described here is oriented such that that region of the pipe section 2 which projects furthest in to the valve housing 3 is arranged at the bottom in relation to a direction of gravitational force. In this case, a vertical lies in the longitudinal plane A, whereas the longitudinal direction B and thus also the primary fluid flow F are oriented horizontally. It is self-evident that the opening plane C may also, in other embodiments, be arranged perpendicular to the longitudinal direction B, and/or also, the longitudinal direction B and thus the primary flow direction of the fluid flow F may be oriented in some other direction with respect to the direction of gravitational force. In this case, as also in the case of the horizontal orientation described here, one or more additional adjustment devices may be provided which, in the absence of the fluid flow F, adjust the flap plate 6 into the rest position, for example by means of spring elements, and/or assist in pivoting the flap plate 6 into the operating position.

Downstream of the pipe section, the valve housing 3 continues into a pipe narrowing 7. The pipe narrowing 7 acts as a funnel which focuses the fluid flow F entering the valve housing 3 through the passage opening 4. Furthermore, the fluid flow F is narrowed to the original pipe diameter again by the pipe narrowing 7.

An axle body 8, to which the flap plate 6 is fixedly attached, is arranged perpendicular to the longitudinal plane A and is positioned in front of the passage opening 4 in a downstream direction. The flap plate 6 is in this case fastened in doubly eccentric fashion to the axle body 8. Firstly, the axle body 8 is attached to the flap plate so as to be offset upwardly from a central point of said flap plate ($1^{st}$ eccentric position). Secondly, the axle body 8 runs outside a plate plane D of the flap plate 6 ($2^{nd}$ eccentric position).

In a rest position, the flap plate 6 is arranged in front of the passage opening 4 in the valve housing 3. In this case, the plate plane D is arranged parallel to the opening plane C. A sealing surface 9 of the flap plate 6 is arranged spaced apart from the valve seat 5 (as illustrated by a solid line).

Under the action of an operating pressure which is generated by the fluid flow F during normal operation, the flap plate 6 can pivot in an opening direction about a geometric axis of rotation E defined by the axle body 8 (as illustrated by a dashed line). Owing to the spacing of the flap plate 6 from the passage opening 4 in the rest position, the flap plate 6 can partially, by way of an upper plate region 24 above the axle body 8, pivot into the passage opening 4 (in this regard, see also FIG. 5). In this way, the valve 1 can have a short structural length in the direction of B. Depending on the operating pressure, the flap plate 6 can in this case assume different operating positions. A lower plate region 25 (in this regard, see for example FIG. 5) may in this case be pivoted into the valve housing 3 and, in the operating position, project for example into the pipe narrowing 7. The rotational movement during the pivoting is preferably restricted such that the flap plate 6 cannot become aligned entirely parallel to the fluid flow F. It is ensured in this way that, in the presence of a closing pressure in the opposite direction, an adequate torque acts on the flap plate 6 about the axis of rotation E in order to initiate a closing movement.

If an explosion occurs downstream, an explosion pressure wave X can exert on the flap plate 6 a closing pressure which opposes the operation pressure. The closing pressure effects a closing movement in a closing direction. In the operating position, the mobility of the flap plate 6 is restricted to a purely rotational movement about the geometric axis E. Owing to the first eccentric arrangement of the axle body 8 on the flap plate 6, the closing pressure generates a resultant torque which pivots the flap plate 6 back from the operating position into the rest position. In the rest position, the rotational movement in the closing direction is restricted, such that the flap plate 6, by way of the lower plate region 25, can pivot no further toward the passage opening 4 in the closing direction.

Proceeding from the rest position, in the closing direction, the flap plate 6 can only be displaced in a linear movement. The closing pressure thus causes a linear displacement of the flap plate 6 together with the axle body 8 toward the passage opening 4. Thus, in a second phase of the closing movement, proceeding from the rest position, the flap plate 6 is set down on the valve seat 5 in a purely linear movement in the direction of B. Owing to the second eccentric position of the axle body 8, both the valve seat 5 and the sealing surface 9 can be of continuous form without the need for free spaces to be provided for receiving the axle body 8. If the flap plate 6 bears by way of the sealing surface 9 against the valve seat 5, a closed position is attained, in which the passage opening 4 is closed by the flap plate 6. Here, the closing pressure presses the flap plate, by way of the sealing surface 9, firmly into or onto the valve seat 5.

Figure 3:
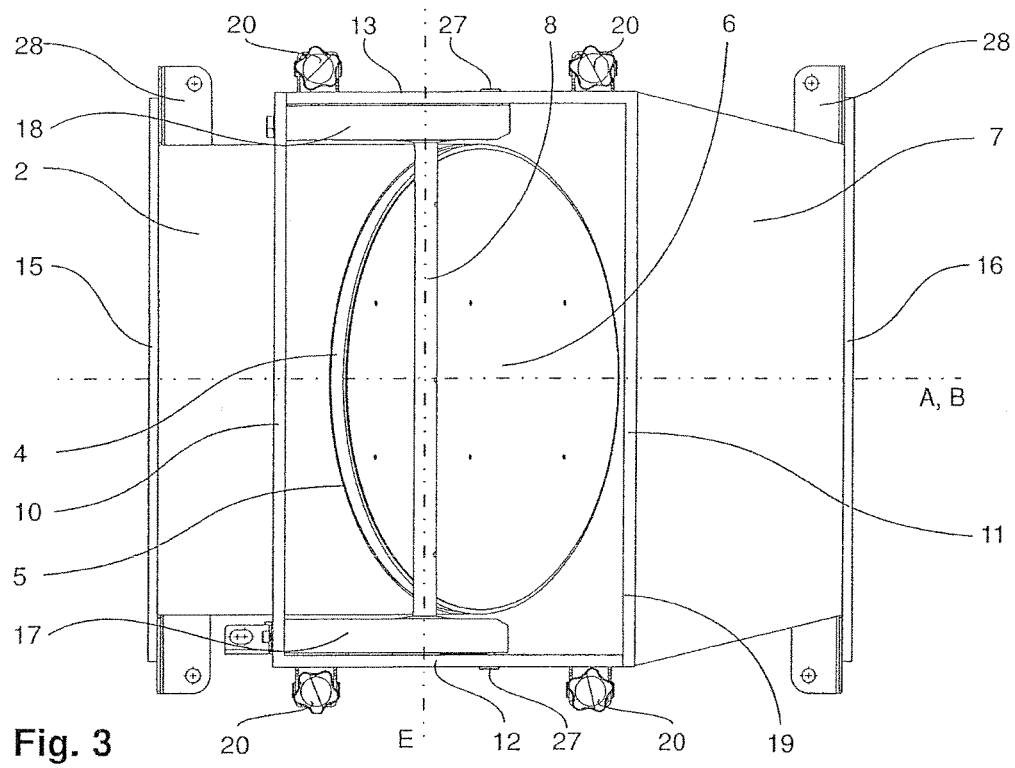
FIG. 3 shows a plan view from above of the explosion protection valve as per FIG. 2 in an open state.

FIG. 2 shows a longitudinal cross section, in the longitudinal plane A, of a specific embodiment of the explosion protection valve 1 according to the invention. FIG. 3 shows a plan view from above of the valve 1, whereas FIG. 4a shows an oblique view, and FIG. 4b shows an oblique view with some elements omitted. Below, FIGS. 2 to 4b will be described jointly.

In the longitudinal direction 8, the valve housing 3 is delimited by a planar face wall 10 arranged upstream and by a planar face wall 11 arranged downstream. The face walls 10 and 11 are arranged perpendicular to the longitudinal plane A. The face walls 10 and 11 are connected in the longitudinal direction B by way of planar side walls 12 and 13 arranged parallel to the longitudinal plane A. At an underside of the valve housing 3, the face walls 10 and 11 and the side walls 12 and 13 are connected by way of a shell surface section 14 which is of semi-cylindrical form with respect to B. A radius of curvature of the shell surface section 14 corresponds to the radius, adjoining the valve housing 3, of the pipe narrowing 7, which transitions flush into the shell surface section 14 at the underside.

The valve housing 3 is thus, in the longitudinal direction B, of substantially prismatic form with a substantially constant U-shaped cross section. The valve housing 3 is of substantially mirror-symmetrical form with respect to the longitudinal plane A. On a top side of the valve housing 3 there is formed a rectangular access opening 19, for example for maintenance purposes, which is delimited by the face walls 10 and 11 and by the side walls 12 and 13 and which can be closed by way of a cover (not illustrated). On the valve housing 3, at the access opening, there are arranged clamping screws 20 for the detachable fastening of the cover. On the pipe section 2 and on the pipe narrowing 7 there are formed stand elements 28 by means of which the valve 1 can be positioned on a stand base in an operationally ready orientation.

The pipe section 2 projects into the valve housing 3 from the outside through the face wall 10. In a lower region, the pipe section 2 extends, in the direction of B, substantially through the entire valve housing 3 as far as a plane of the face wall 11. At a longitudinal end outside the valve housing 3, the pipe section 2 has an attachment flange 15 by means of which the valve 1 can be attached to an upstream pipeline (not illustrated).

In the longitudinal direction B away from the valve housing 3, the pipe narrowing 7 converges conically. The face wall 11 is open to the pipe narrowing 7 over the entire cross section, adjoining the valve housing 3, of said pipe narrowing. At the face wall 11, the pipe narrowing 7 has a diameter, perpendicular to the longitudinal direction B, which is greater than a corresponding diameter of the pipe section 2. At a longitudinal end remote from the housing, the pipe narrowing 7 has a diameter which corresponds to the diameter of the pipe section 2. The pipe narrowing 7 can be connected to the pipeline by way of an attachment flange 16. The pipe section 2 and pipe narrowing 7 are arranged coaxially in the valve.

On the inner side of each of the side walls 12 and 13, there is formed a respective bearing 17 and 18. The bearings 17 and 18 are of mirror-symmetrical form and arrangement with respect to the longitudinal plane A. On each side wall 12 and 13 there is arranged a safety support 27 which engages into a recess 48 of the bearing 17 or 18 respectively (in this regard, see FIG. 7). The safety support 27 serves for additional support of the bearing 17 or 18 respectively on the valve housing 3 in the event of an explosion.

The axle body 8 is mounted on the valve housing 3 at both bearings 17 and 18. The axle body 8 thus projects through the valve housing 3 transversely, that is to say perpendicularly to the longitudinal plane A, downstream of the passage opening 4. The flap plate 6 is fixedly attached to the axle body 8. FIG. 2 shows the flap plate in the rest position, in which the plate plane D is arranged parallel to the opening plane C of the passage opening 4 of the pipe section 2. The flap plate 6 is in the form of a disc-shaped body with an elliptical surface, which corresponds to a cross section of the passage opening 4 in the opening plane C.

FIG. 3 shows a plan view of the valve 1 from above, and FIG. 4 shows an oblique view of the valve 1 toward the face wall 5 from downstream. Here, for a better overview, side walls 12 and 13, shell surface section 14, face wall 11 and pipe narrowing 7 are not illustrated.

FIG. 5 shows a schematic cross-sectional view of the flap plate 6 in the longitudinal, plane A in the rest position (solid lines). Here, the flap plate 6 is in the form of a layered body with multiple material layers. Upstream and downstream, the flap plate 6 has, on the outer sides, in each case one layer 21 composed of conventional steel. Between the steel layers 21 there is arranged a spring steel layer 22. It is self-evident that some other material selection for the layers 21 and 22 is also conceivable, for which reason the exemplary embodiment described here is to be understood merely as an example.

The layers 21 and 22 are connected to one another in punctiform fashion, such that displaceability of the layers 21 and 22 relative to one another is realized in sections. Over the ent circumference, the spring steel layer 22 projects beyond the steel layers 21 at the edge side in the plate plane D. The steel layers 21 are in this case dimensioned such that, when the flap plate 6 is in a parallel arrangement with respect to the opening plane C, said steel layers can be introduced into the passage opening 4 within the valve seat 5. By contrast, the spring steel layer 22 projects beyond said steel layers to such an extent that it comes to bear against the valve seat 5 in the closed position. Thus, on the side of the passage opening 4, the spring steel layer 22 realizes the sealing surface 9. In this way, the flap plate 6 can, under the action of the closing pressure, be pressed into the passage opening 4 counter to the spring force of the spring steel layer 22.

On a side averted from the passage opening 4 in the rest position, the flap plate 6 has stiffening ribs 23 which are arranged perpendicular to the axle body 8 or to the geometric axis of rotation E defined by said axle body. The stiffening ribs 23 impart additional mechanical stability to the flap plate 6 in the case of a lightweight and material-saving design. To reduce a flow resistance, the axle body 8 is of flattened form in the direction of the plate plane D. Furthermore, the flap plate 6 may have a profiled body 26 on the side averted from the passage opening 4, which profiled body for example covers the axle body 8 and the stiffening ribs 23 (in this regard, see also FIG. 10). The profiled body 26 may for example be designed in the manner of an aerofoil profile, such that, in addition to the impact pressure, the fluid flow F also generates dynamic lift, which assists the opening movement into the operating position. The profiled body 26 may in this case be in the form of a profiled shell.

In the operating position (illustrated by dashed lines), the upper plate region 24 has been at least partially pivoted into the passage opening 4 (see arrow). The lower region has been pivoted away from the passage opening 4. Owing to the first eccentric position of the axle body 8, the plate region 24 is of smaller dimensions than the plate region 25. It is ensured in this way that the fluid flow F exerts an opening moment on the flap plate 6. It is likewise ensured that an explosion pressure wave X generates a closing moment. Furthermore, in the absence of an operating or closing pressure, the flap plate 6 passes into the rest position under the action of gravitational force.

FIG. 6 schematically shows a possible diagrammatic sketch of the bearing 17 which provides the sequential sequence of the mobility of the flap plate 6 as described here.

The bearing 17 comprises a preferably monolithic bearing body 30 (not illustrated in FIG. 6, see for example FIG. 7), in which there is formed a recess 31 for a control body 32. The recess 31 forms a rotary guide for the control body 32 with a geometric axis of rotation G. The axis of rotation G coincides with the axis of rotation E of the axle body 8 when the control body 32 is guided in the rotary guide. The control body 32 is in the form of a bar-shaped, substantially prismatic body and, centrally, is connected to the axle body 8. A longitudinal direction of the control body 32 is in this case arranged perpendicular to the axis of rotation E defined by the axle body 8.

The axle body 8 is mounted in a longitudinal guide, in the form of a slot 33, of the bearing body 30 so as to be guided rotatably about its axis E and so as to be guided displaceably in the longitudinal direction L of the bearing body 17. The longitudinal direction L is, in the installed state of the bearing 17, arranged parallel to B.

The recess 31 is delimited in a radial direction by two circular cylindrical shell surface sections 34 which are arranged opposite one another with respect to the axis of rotation G. A spacing of the shell surface sections 34 corresponds (with a mobility tolerance) to a radial length of the control body 32, wherein a radius of curvature corresponds to half of the length of the control body 32. The shell surface sections 34 thus form a radial plain bearing for end sides of the control body 32. The end sides of the control body 32 are in this case formed correspondingly to a curvature of the shell surface sections 34. For as long as the control body 32 abuts against both shell surface sections 34, it is mounted in the rotary guide so as to be guided rotatably about the axis G. Here, a base surface of the recess 31 forms a support in the axial direction along G.

In the recess 31 there are formed two stops 35, which in the present case are of gable-shaped form and which, with an apex directed toward the axis G, project into the recess. The stops 35 each have, on one of their gable surfaces, a stop surface 36, said stop surfaces being oriented parallel to the bearing axis L. In their alignment along L, the stop surfaces 36 have a spacing which corresponds to a radial width of the control body 32. The respective other gable surface of each stop 35 is formed analogously as a stop surface 37, said stop surfaces however being oriented perpendicular to the longitudinal direction L. The stop surfaces 36 and 37 thus limit the rotational movement of the control body 32 in both directions of rotation about the axis of rotation G to 90 degrees.

In the longitudinal direction L, the recess 31 is adjoined by a groove section 38. The groove section 38 has a cross section which corresponds to the cross section of the control body 32. The lateral guide surfaces 39 of the groove section 38 are in alignment, in the direction of L, with the stop surfaces 36, wherein one of the guide surfaces 39 transitions smoothly into one of the stop surfaces 36.

When the control body 32 is situated in a rotational position in which it bears against the stop surfaces 36, it can thus be displaced into the groove section 38 in the longitudinal direction L. Here, the axle body 8 is also displaced in the longitudinal guide 33. The stop surfaces 36 thus form a plain bearing for the linear movement of the control body 32 (in this regard, see also FIG. 10). When the control body 32 passes into the groove section 38, it is blocked so as to be prevented from rotating about E. The groove section 38 forms a linear guide of the bearing 17, which provides linear mobility of the control body 32.

FIG. 7 shows a specific implementation of the bearing 17 in a cross-sectional view in a plane parallel to the longitudinal plane A and passing through the bearing 17. The bearing 18 is, analogously, of mirror-symmetrical construction with respect to A. For a description of the elements with reference signs 30 to 39, reference is made to FIG. 6.

In the present case, the stop surfaces 37 are arranged so as to be inclined relative to the longitudinal direction L, such that the rotational movement in the rotary guide is restricted to an angle of less than 90°. On the stop surfaces 36 there is arranged in each case one rolling body 40 in the form of rolling bodies mounted in rolling body cages. For this purpose, the stop surfaces 37 have rolling body beds in the form of recesses. The rolling body 40 at the stop surface 36, which transitions smoothly into one of the guide surfaces 39, extends into the groove section 38. It is self-evident that, depending on requirements, there may be no need to provide rolling bearings, and the stop surfaces 36 may also be in the form of simple plain bearings.

In the direction of L, a measurement pin 41 projects into the groove section 38, which measurement pin is mounted, so as to be displaceable in its longitudinal direction, on the bearing body 30. The measurement pin 41 forms a part of a measurement device for determining a position of the flap plate 6. The pin 41 is supported on the bearing body 30 via two helical springs positioned in series. In the illustration of FIG. 7, the pin 41 has been displaced by the control body 32 into a first measurement position. The pin 41 thus indicates a position of the control body 32 in which the latter can be introduced into the linear guide.

If the control body 32 is rotated in the rotary guide, for example when the flap plate 6 passes into the operating position, the pin 41 passes into a rest position in which it projects into the recess 31. If the control body 32 is displaced into the linear guide, that is to say into the groove section 38, the pin 41 passes into a second measurement position. At the outer side, the pin 41 projects beyond the bearing body 30, whereby, at an outer longitudinal end of the pin 41, a displacement state or a measurement position can be read off or measured, for example by corresponding sensors.

The shell surface section 34 adjoining the groove section 38 is, in the present case, formed on a bearing shoe 42. That guide surface 39 of the groove section 38 which adjoins said shell surface section 34 is likewise formed on the bearing shoe 42. The bearing shoe 42 is mounted on the bearing body 30 so as to be displaceable in the direction of L 102. A displacement is realized by way of a threaded spindle 43 with an external threaded head portion 43' which is supported on the bearing body 30 via an internal thread 100. The threaded spindle 43 is supported, so as to be rotatable in the direction of L, on the bearing shoe 42 via an insert 44 of the bearing shoe 42. Here, the insert 44 is inserted loosely into a recess of the bearing shoe 42.

On the guide surface 39 formed on the bearing shoe 42, a blocking body, in the form of a ball 46, of a locking device 70 is arranged in a recess 45. The locking device 70 further comprises the recess 45 and a spring-loaded pressure element 47. In this case, the recess 45 has a base which is oblique with respect to L and which is inclined away from L in the displacement direction. The recess thus forms a blocking body bed. The spring-loaded pressure element 47 which is supported on the bearing body 30 displaces the ball 46 in the recess 45 in the direction of the rotary guide by way of a spring force 101. The oblique base of the recess 45 is dimensioned such that the ball 46, when in a position close to the rotary guide, projects into the groove section 38 and, when in a position remote from the rotary guide, is arranged so as to be entirely recessed into the recess 45. If the control body 32 is displaced into the groove section 38, the ball 46 deflects in the displacement direction. By contrast, during a displacement in the opposite direction, the ball 46 becomes wedged between the control body 32 and bearing shoe 42. The ball 46 thus acts with the recess 45 and the spring-loaded pressure element 47 as a freewheel which interacts with the control body 32 such that the latter, when it has passed into the linear guide to an adequate extent, is blocked so as to be prevented from being displaced in the linear guide counter to the closing direction.

The bearing shoe 42 forms part of a release device of the locking device 70. By virtue of the bearing shoe 42 being displaced toward the rotary guide, for example by means of actuation of the threaded spindle 43, the wedging action of the ball 46 can be released, whereby the control body 32 can be displaced in the linear guide, that is to say in the groove section 38, counter to the closing direction.

On the bearing body 30 there is furthermore formed a recess 48 into which a safety support of the valve housing 3 can engage. The safety support is provided in addition to fastening means 49 by which the bearing 17 is fastened in the valve housing 3 during normal operation. In the event of an explosion, relatively high forces act on the bearing 17 owing to the closing pressure. In this case, the safety support arranged in the recess 48 absorbs a part of said forces and transmits these into the valve housing 3. In this way, the forces on the bearing 17 can be distributed more uniformly, without the assembly of the bearing 17 being made more complex.

FIG. 8 shows selected elements of the valve 1, wherein the flap plate 6 is arranged in an operating position. The control body 32 of the bearing 17 has in this case been rotated in the recess 31 of the rotary guide about G (and about E) as far as the stop surfaces 37. In the installed state, the bearing body 30 bears by way of an outer side against an inner side of the side wall 12, such that the guides and further constituent parts of the bearing 17 are covered.

FIG. 9a schematically shows a further possible diagrammatic sketch of a bearing 17 for an explosion protection valve 1 according to the invention.

An axle body 8' is mounted in a longitudinal guide 33' on a bearing body 30' (not illustrated in FIG. 9a, in this regard see FIG. 9b) so as to be displaceable in a longitudinal direction L' of the bearing 17' and so as to be rotatable about the longitudinal axis E' of said bearing. A control body 32' which is eccentric with respect to the axle body 8' and is rigidly connected to the latter is guided, in a curved guide 31', on a circular segment-shaped path about an axis of rotation G'. The curved guide 31' thus ensures, by way of the control body 32', that the axle body 8' is rotatable about G' and thus, in this position, about E', but is not displaceable in the longitudinal guide 33'.

The curved guide 31' is adjoined by a longitudinal guide 38' which is arranged parallel to L' and to the longitudinal guide 33'. When the control body 32' passes into the longitudinal guide 38', the axle body 8' is blocked so as to be prevented from rotating, but can be displaced in the longitudinal direction L' in the longitudinal guide 33'.

The curved guide 31' thus provides a rotary guide within the meaning of the invention, whereas the longitudinal guide 38' correspondingly forms a linear guide. The rotational movement and the linear movement of a flap plate 6' (not illustrated in FIG. 9a; see FIG. 9b) connected rigidly to the axle body 8' can thus take place only in succession.

FIG. 9b shows a specific embodiment of the bearing 17'. The curved guide 31 is in the present case in the form of a control surface on the bearing body 30', which control surface forms merely a unilateral guide surface for the control body 32'. By contrast, the longitudinal guide 38' is in the form of a bilaterally acting guide groove. The flap plate 6' is connected to the axle body 8' by way of a bearing block 29'. The control body 32' is fixedly attached to the bearing block 29'.

FIG. 10 shows view, substantially corresponding to FIG. 8, of the explosion protection valve 1, wherein the stop surfaces 36 of the bearings 17 and 18 are formed as sliding surfaces for the control body 32. In the illustration of FIG. 10, it is furthermore the case that the bearing shoe 42 is designed such that the shell surface section 34 is only partially arranged on the bearing shoe 42. The other section 34, which is not arranged on the bearing shoe 42, is formed on the bearing body 30. Furthermore, in FIG. 10, the flap plate 6 has the profiled body 26 (in this regard, see FIG. 5) which is arranged on a side of the flap plate 6 which is arranged downstream in the rest position. Furthermore, by contrast to the illustration in FIG. 8, the flap plate is situated in the rest position.

The invention claimed is:

1. An explosion protection valve for explosion decoupling for shutting off a fluid flow, the explosion protection valve comprising:
    a valve housing with a passage opening for passage of the fluid flow, and a valve seat arranged at the passage opening,
    a closing body with a sealing surface, wherein
    the closing body is mounted in movable fashion in the valve housing on a bearing and is movable at least between a rest position, an operating position and a closed position,
    the closing body is situated in the rest position in an absence of the fluid flow, the passage opening is opened by the closing body in the operating position, and the passage opening is closed by the closing body in the closed position, and the closing body, in the closed position, bears by way of the sealing surface against the valve seat,
    the closing body is movable into the operating position under an action of operating pressure, and is movable into the closed position under an action of a closing pressure that differs from the operating pressure,
    the closing body is arrestable in the closed position by a locking device,
    the bearing of the closing body allows movement of the closing body in a closing direction from the operating position into the closed position by way of a rotational movement and a linear movement,
    the closing body is mounted on the bearing by way of an axle body,
    the bearing comprises a rotary guide and a linear guide for a control body which is connected rigidly to the closing body, and
    the bearing additionally comprises a longitudinal guide in which the axle body is guided in a rotatable and a displaceable fashion, and a displacement direction of the longitudinal guide is parallel to a displacement direction of the linear guide for the control body.

2. The explosion protection valve as claimed in claim 1, wherein the bearing allows movement of the closing body, for transition from the operating position into the closed position, firstly purely in the rotational movement and subsequently purely in the linear movement.

3. The explosion protection valve according to claim 1, wherein the sealing surface of the closing body and the valve seat are of planar form and are oriented plane-parallel to one another when the closing body is movable in the linear movement.

4. The explosion protection valve according to claim 1, wherein the control body is rigidly connected to the closing body via the axle body, and the control body is centrally arranged with respect to the axle body.

5. The explosion protection valve according to claim 1, wherein the rotary guide and the linear guide are designed and arranged, relative to one another, and allow introduction of the control body into the linear guide from the rotary guide only in a predefined rotational position.

6. The explosion protection valve according to claim 5, wherein the rotary guide has a recess in which the control body, guided in at least one of a radial and an axial direction, is at least partially rotatable about a geometric axis of rotation defined by the rotary guide.

7. The explosion protection valve according to claim 6, wherein the recess, in a radial direction with respect to the geometric axis of rotation, is at least partially delimited by circular cylindrical shell surface sections with a radius of curvature which corresponds to half of a radial dimension of the control body.

8. The explosion protection valve according to claim 6, wherein the linear guide comprises a groove section which adjoins the recess in a radial direction and into which the control body is displaceable out of the recess of the rotary guide in the displacement direction of the linear guide.

9. The explosion protection valve according to claim 6, wherein, in the recess, at least one stop element is formed with a stop surface which delimits the rotational movement of the control body in the recess and allows displacement of the control body into the linear guide when said control body bears against the stop surface.

10. The explosion protection valve according to claim 9, wherein the stop surface forms a plain bearing for the control body.

11. The explosion protection valve according to claim 9, wherein, on the stop surface, a rolling bearing is arranged for the control body.

12. The explosion protection valve according to claim 1, wherein the locking device comprises a freewheel which permits mobility of the closing body, in the closing direction, and blocks the mobility in the opposite direction, at least when the closing body is in the closed position.

13. The explosion protection valve according to claim 12, wherein the freewheel is formed on a bearing shoe which, for the release of the freewheel, is arranged in the bearing and is displaceable in a release direction.

14. The explosion protection valve according to claim 13, wherein the bearing shoe comprises at least one of a part of the linear guide and a part of the rotary guide.

15. The explosion protection valve according to claim 1, wherein a monitoring device is provided by which a present position of the closing body is monitorable.

16. The explosion protection valve according to claim 15, wherein the monitoring device comprises a mechanical measurement sensor which is placeable into different measurement positions in a manner dependent on the position of the closing body, and the mechanical measurement sensor is placeable into a first measurement position, when the closing body is in the rest position, and into a second measurement position, when the closing body is in a position between the rest position and the closing position.

17. The explosion protection valve according to claim 16, wherein the mechanical measurement sensor comprises a pin which is deflectable on the bearing counter against a spring force.

18. The explosion protection valve according to claim 1, wherein the passage opening is in the form of an end-side opening of a pipe stub which is at least partially arranged in the valve housing, and an end surface, arranged in the valve housing, of the pipe stub forms the valve seat.

19. The explosion protection valve according to claim 1, wherein the closing body is in the form of a flap plate.

20. An explosion protection valve for explosion decoupling for shutting off a fluid flow comprising:
a valve housing with a passage opening for the passage of the fluid flow, and a valve seat arranged at the passage opening,
a closing body with a sealing surface, wherein
the closing body is mounted in movable fashion in the valve housing on a bearing and is movable at least between a rest position, an operating position and a closed position,
the closing body is situated in the rest position in an absence of the fluid flow, the passage opening is opened by the closing body in the operating position, and the passage opening is closed by the closing body in the closed position, and the closing body, in the closed position, bears by way of the sealing surface against the valve seat,
the closing body is movable into the operating position under an action of operating pressure, and is movable into the closed position under an action of a closing pressure that differs from the operating pressure,
the closing body is arrestable in the closed position by a locking device,
the bearing of the closing body allows movement of the closing body, in a closing direction, from the operating position into the closed position by way of a rotational movement and a linear movement,
the closing body is mounted on the bearing by way of an axle body,
the bearing comprises a rotary guide and a linear guide for a control body which is connected rigidly to the closing body,
the rotary guide and the linear guide are designed and arranged relative to one another and allow introduction of the control body into the linear guide from the rotary guide only in a predefined rotational position,
the rotary guide has a recess in which the control body, guided in at least one of a radial and an axial direction, is at least partially rotatable about a geometric axis of rotation defined by the rotary guide, and
the recess is, in a radial direction with respect to the geometric axis of rotation, at least partially delimited by a circular cylindrical shell surface sections with a radius of curvature which corresponds to half of a radial dimension of the control body.

21. An explosion protection valve for explosion decoupling for shutting off a fluid flow comprising:
a valve housing with a passage opening for the passage of the fluid flow, and a valve seat arranged at the passage opening,
a closing body with a sealing surface, wherein:
the closing body is mounted in movable fashion in the valve housing on a bearing and is movable at least between a rest position, an operating position and a closed position, wherein
the closing body is situated in the rest position in an absence of the fluid flow, the passage opening is opened by the closing body in the operating position, and the passage opening is closed by the closing body in the closed position, and the closing body, in the closed position, bears by way of the sealing surface against the valve seat, the closing body is movable into the operating position under an action of operating pressure, and is movable into the closed position under an action of a closing pressure that differs from the operating pressure, the closing body is arrestable in the closed position by a locking device, wherein the bearing of the closing body allows movement of the closing body in a closing direction from the operating position into the closed position by way of a rotational movement and a linear movement, the locking device comprises a freewheel which permits the mobility of the closing body, in the closing direction, and blocks the mobility in the opposite direction, at least when the closing body is in the closed position, the freewheel is formed on a bearing shoe which, for the release of the freewheel, is arranged in the bearing and is displaceable in a release direction, and the bearing shoe comprises at least one of a part of the linear guide and a part of the rotary guide.

* * * * *